June 12, 1956  W. W. SLOANE  2,750,551
LOCOMOTIVE BRAKING CIRCUIT
Filed Nov. 14, 1951
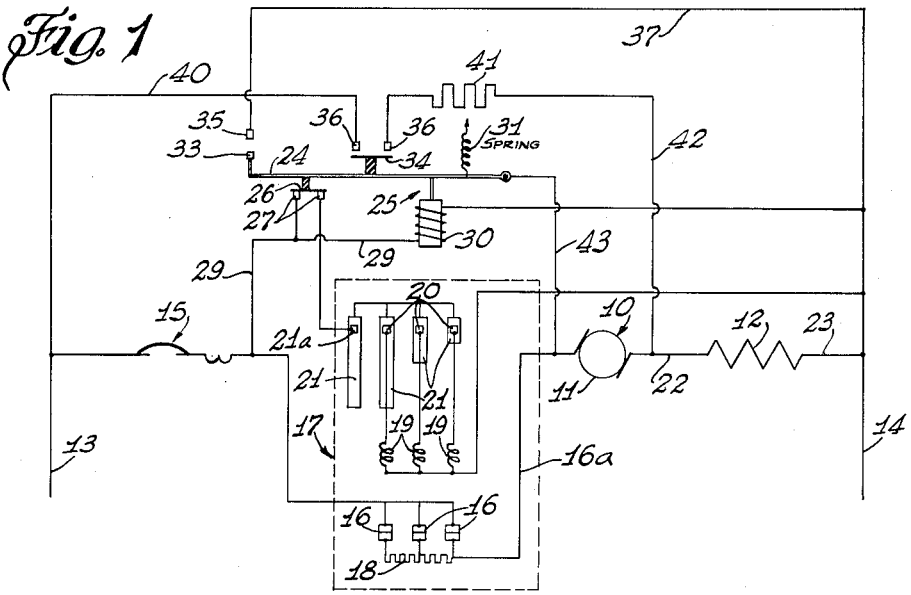
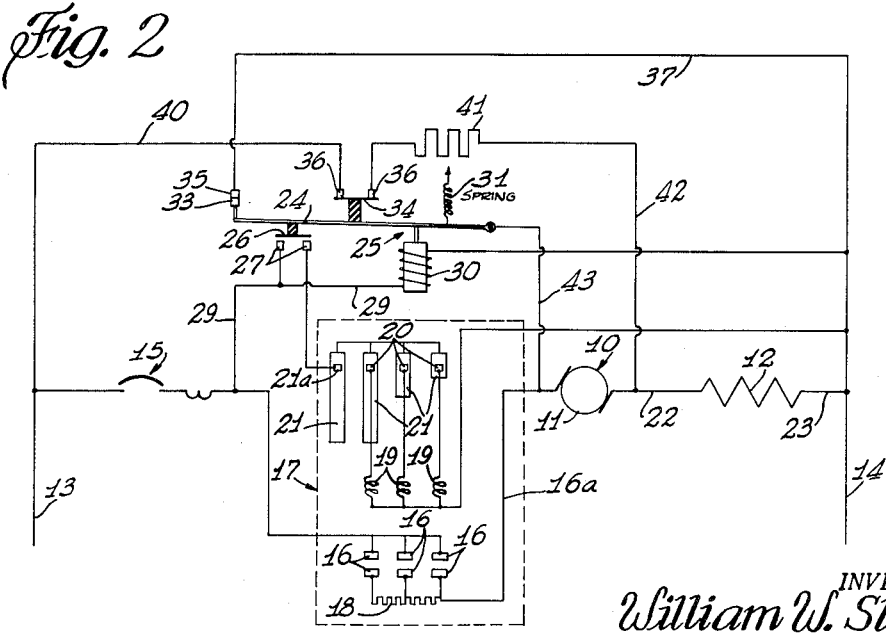
INVENTOR.
William W. Sloane
BY
Murray A. Gleeson
ATTORNEY

United States Patent Office 2,750,551
Patented June 12, 1956

2,750,551
LOCOMOTIVE BRAKING CIRCUIT

William W. Sloane, Chicago, Ill., assignor to Goodman Manufacturing Company, Chicago, Ill., a corporation of Illinois Application November 14, 1951, Serial No. 256,181

3 Claims. (Cl. 318—368)

This invention relates to improvements in control systems for electric motors, and more particularly relates to a safety system automatically converting a traction motor to a generator, to dynamically brake the vehicle driven thereby upon a failure of power.

Heretofore, when electric locomotives, and particularly those used in mines, are traveling up a grade with a heavy trip and the circuit is interrupted, as by the opening of the overload relay or an interruption in the mine main line circuit, the trip frequently moves backwardly down grade and accelerates to a dangerous speed before the brakes can be applied.

A principal object of my invention is to overcome these difficulties by providing a safety circuit particularly adapted for a mine locomotive, converting the locomotive to a generator and dynamically braking and holding the reverse coasting speed of the locomotive and trip to a safe speed.

Another object of my invention is to provide a control circuit for mine locomotives having a circuit automatically creating a short circuit around the locomotive motor upon interruption in the locomotive circuit.

Still another object of my invention is to provide a control circuit for a mine locomotive particularly adapted to hold the reverse coasting speed of the locomotive and trip to a safe speed upon failure in power, and having a relay having one set of contacts normally holding the locomotive circuit closed and another set of contacts, normally open when power is being supplied in the locomotive motor and closing to create a short circuit around the locomotive motor upon the failure of power, and converting the motor to a shunt generator to act as a dynamic brake and hold the reverse coasting speed of the locomotive to a safe speed.

These and other objects of my invention will appear from time to time as the following specification proceeds and with reference to the accompanying drawing, wherein:

Figure 1 is a schematic wiring diagram illustrating one form in which my invention may be embodied and showing the circuit in a normal running condition; and Figure 2 is a schematic wiring diagram similar to Figure 1, but showing the circuit to the locomotive open and the locomotive motor connected to dynamically brake the locomotive.

In the embodiment of my invention illustrated in the drawing, a traction motor 10 is diagrammatically shown as including an armature 11 and a series field 12. The motor 10 may be of any well known form commonly used to propel mine locomotives, and in the illustrative embodiment of my invention shown, one motor only is included in the circuit. It should be understood, however, that any desired number of motors may be provided to propel the locomotive and that the principle of operation of the circuit is the same, regardless of the number of motors used.

Main line conductors 13 and 14, which may be connected with a source of electric power are shown as supplying electric power to the motor 10 through an overload relay 15 of a conventional type connected with the conductor 13, and through contacts 16, 16 of a controller 17. The contacts 16, 16 are arranged to progressively cut out a resistance 18 from the motor 10 and are connected with the armature 11 through a conductor 16a.

The controller 17 may be of any well known form and is herein diagrammatically shown as being a manually-operated contactor-type of controller and may include a reverse drum (not shown) which may preferably be of a conventional manual type, or if of a magnetic type, may be such as will maintain the circuit when the current is interrupted, as is well known to those skilled in the art.

The contacts 16, 16 are closed upon the energization of coils 19, 19, which are connected with the conductor 14 in parallel with the motor 10 and are energized when contact fingers 20, 20 come in contact with contacts 21, 21 on the control drum of the controller. The contacts 21, 21 are connected with the power line 13 by a contact finger 21a, shown as engaging an end contact 20 and connected with the conductor 13 through contacts 27, 27 shown as engaging a contact 26 on a contact arm 24 of a relay 25, a conductor 29 and the overload relay 15.

The field 12 of the motor 10 is connected with the armature 11 through a conductor 22, and with the conductor 14 through a conductor 23. Thus, when the overload relay 15 is closed and the controller drum is turned to progressively close the contacts 16, 16, the motor will be connected to operate as a series motor.

A circuit is provided to maintain the circuit to the coils 19, 19 closed as long as the overload relay 15 is closed and the respective contacts 21, 21 are engaged by the associated contact fingers 20, 20 and power is supplied to the conductors 13 and 14, which is shown for illustrative purposes as including the contact arms 24 of the relay 25. The contact arm 24 has the contact 26 maintained in engagement wtih the contacts 27, 27 as long as there is power in the motor circuit, to complete a circuit from the conductor 29 to the contacts 21, 21 of the controller 17, and through one or more of the coils 19, 19, depending upon the position of the controller drum. The conductor 29 is connected with the conductor 13 through the overload relay 15 and is also connected with and energizes a coil 30 of the relay 25, to maintain the circuit to the contacts 21, 21 until an interruption in the power circuit to the motor 10 as by opening of the overload relay 15 or an interruption in the circuit to the conductors 13 and 14.

A biasing means, such as a tension spring 31 is shown as being connected to the arm 24 of the relay 25 to bias said relay into position to open the circuit between the contacts 27, 27 when the circuit to the coil 30 is broken, as by opening of the overload relay 15 or the interruption in power in the main line circuit. The contact arm 24 of the relay 25 is also shown as having contacts 33 and 34 thereon, engageable with contacts 35 36, respectively, when the circuit through the coil 30 is broken. The contact 35 is connected with a conductor 37 having connection with the conduction 14. One contact 36 is connected with the conductor 13 through a conductor 40. The other contact 36 is connected with an exciter or teaser resistance 41. The teaser resistance 41 is connected with the conductor 22 and field 12 to provide current to excite said field through a conductor 42.

While I have shown a single contact arm and relay having the contacts 26, 33 and 34 thereon, it is obvious that any other arrangement of contacts may be provided, as well as separate relays, as long as the desired result is attained.

Upon overload conditions when the circuit to the coil 30 of the relay 25 is broken by opening of the overload relay 15, as shown in Figure 2, the spring 31 will bias the contact arm 24 to engage the contact 33 with the contact 35 and to engage the contact 34 with the contacts 36, 36. The circuit through the contacts 26 and 27 will also be broken and the coils 19, 19, will be deenergized. The contacts 16, 16 will then open. A short circuit will then be created around the armature 11 and field 12 of the motor 10 through a conductor 43. The conductor 43 is connected from the conductor 16a with the contact arm 24 of the relay 25. The short circuit will thus be through the conductor 43, contact arm 24 of the relay 25, the contacts 33 and 35 of said relay and the conductor 37 and connecting the armature and field in a closed loop circuit. A circuit will also be completed through the contacts 34 and 36, 36 to connect the resistor coil 41 in the circuit to the field 12 to excite said field. The motor 10 will then operate as a shunt generator upon reversal thereof, as when the locomotive and trip may start to coast backward downhill. The resistance of the short circuit being low, the motor will generate enough current at the slow speed of reversal thereof to provide dynamic braking sufficient to prevent acceleration of the locomotive.

If on the other hand the main line circuit should be interrupted, as by opening of the main line circuit breaker, or if the trolley should jump the trolley wire, no power will be available for the teaser coil 41 to excite the armature 12. Since, however, the reversal of the locomotive and trip and the resultant reversal of the motor 10 as the trip may start to coast downgrade occurs very rapidly, and since the polarity of the motor fields is not reversed, the residual magnetism will be sufficient to hold enough excitation in the motor fields to cause the motor to pick up as a generator.

During operation of the locomotive while hauling its trip upgrade, if the overload relay should open due to overload conditions, the spring 31 will bias the contact arm 24 to engage the contact 33 with the contact 35 and create a short circuit around the armature 11 and the field 12, connecting the locomotive motor to operate as a shunt generator. If the power failure should be due to overload conditions, circuit to the exciter or teaser coil 41 through the contacts 34 and 36, 36 will be completed to provide a teaser current from the field 12. Contacts 16, 16 will drop out at the same time. If the trolley should jump the wire or there should be a power failure due to some other condition, the residual magnetism will be sufficient to hold enough excitation in the motor fields to cause the motor to pick up as a generator as has previously been mentioned. The locomotive motor 10 will then operate as a generator upon any tendency of the locomotive to reverse and coast downgrade with its trip, and because of the low resistance of the short circuit, an extremely slow speed of the locomotive as it starts to reverse and roll downgrade will generate enough current to provide sufficient dynamic braking to prevent acceleration of the locomotive and trip.

It may be seen from the foregoing that a simple and novel safety circuit has been provided for mine locomotives, which normally maintains the circuit to the locomotive motor and connects said motor to operate as a motor, but creates a short circuit around the motor upon a failure of power and connects the motor to pick up as a shunt generator and provide dynamic braking to prevent acceleration of the locomotive and its trip of cars, where the trip may start to coast back downhill while traveling upgrade, when a power failure occurs.

It may further be seen that this safety control circuit is as effective when there is a complete failure of power in the main line circuit as when the failure of power occurs in the locomotive itself, as by the opening of the overload relay.

It will be understood that modifications and variations may be effected without departing from the scope of the novel concepts of the present invention.

I claim as my invention:

1. A safety circuit for mine locomotives including a motor having an armature and a field winding connected in series therewith, main line conductors connected with said armature and field winding, a controller in circuit with one of said main line conductors for starting the motor, a relay having at least two sets of contacts, one set being normally closed and the other set being normally open, said relay having an operating coil connected in circuit with said main line conductors and holding said normally closed contacts closed when energized, an auxiliary conductor leading from one of said main line conductors to said set of normally closed contacts of said relay and connecting said controller to said main line conductors to energize said motor when said controller is in an on position and said contacts are closed, another conductor connected from one side of said armature to said field winding through said normally open contacts of said relay, and means closing the normally open contacts of said relay upon deenergization of the coil thereof independently of the position of said controller, to connect said armature and field in a closed loop circuit through said last mentioned conductor and connect said armature to operate as a generator and dynamically brake the locomotive and prevent the locomotive from accelerating upon the tendency to reversely coast downgrade upon a failure of power in said auxiliary conductor, regardless of the position of said controller.

2. In a safety control circuit for mine locomotives including a motor having an armature and a field winding connected in series therewith, main line conductors connecting said armature and field winding with a source of supply of electric power, an overload relay in circuit with one of said main line conductors, a controller having contacts in circuit with said one main line conductor between said overload relay and said motor for starting said motor, operating coils for said contacts of said controller connected from one of said main line conductors to the other through said overload relay, a second relay having a coil connected in parallel with said motor and having contacts connected in the circuit to said operating coils for said contacts of said controller and closed upon energization of said coil for said overload relay, to normally hold said contacts of said controller closed, but to break the circuit to said coils upon the opening of the circuit to said coil of said second relay, said second relay having two sets of normally open contacts, and closing upon deenergization of said coil for said second relay, a conductor connected from said motor between said armature and said field winding to one of said main line conductors through one of said sets of normally open contacts of said second relay and having a teaser resistance coil therein, another conductor connected around said armature and field winding through the other of said sets of normally open contacts of said second relay and connecting the armature and field winding in a closed loop when said other normally open contacts are closed, and means closing said normally open contacts of said second relay and opening said normally closed contacts upon opening of said overload relay and deenergization of said coil of said second relay and connecting said motor in a closed loop circuit to operate as a generator and dynamically brake the locomotive regardless of the position of said controller.

3. A safety circuit for mine locomotives including a motor having an armature and a field winding connected in series therewith, main line conductors connected with said armature and field winding for supplying current thereto, a controller having contacts in circuit with one of said main line conductors for connecting said conductor to said armature to start said motor, a relay having contacts connected in circuit with one of said main line conductors and having a coil operative to hold the circuit to said armature and field winding closed under normal operating conditions, a second relay having at least two sets of contacts, an auxiliary conductor leading from one of said main line conductors to one of said sets of contacts of said second relay and connected to bypass said controller and maintain said coil of said first relay energized to hold said first relay closed regardless of the position of said controller, said second relay having a coil connected in said auxiliary conductor and continually connected in said main line conductors by said auxiliary conductor and said first relay, a second auxiliary conductor connected from said armature to one of said normally open contacts of said second relay, a third conductor connected from said one normally open contact of said second relay to one terminal of said field winding, to connect the armature and field winding in a closed loop circuit upon closing of said normally open contacts of said first relay upon the deenergization of the coil of said second relay, and spring means closing said normally open contacts of said second relay upon deenergization of the coil thereof and effecting dynamic braking of the locomotive regardless of the position of the controller.

References Cited in the file of this patent

UNITED STATES PATENTS

| | | |
|---|---|---|
| 1,411,700 | Holmes et al. | Apr. 4, 1922 |
| 1,414,403 | Gazda | May 2, 1922 |
| 1,434,055 | Henderson | Oct. 31, 1922 |
| 2,193,642 | Parvin | Mar. 12, 1940 |
| 2,364,486 | Starie et al. | Dec. 5, 1944 |